Aug. 26, 1958     C. H. SCHNORR, JR     2,848,846
GLASS BENDING MOLDS
Filed April 20, 1956
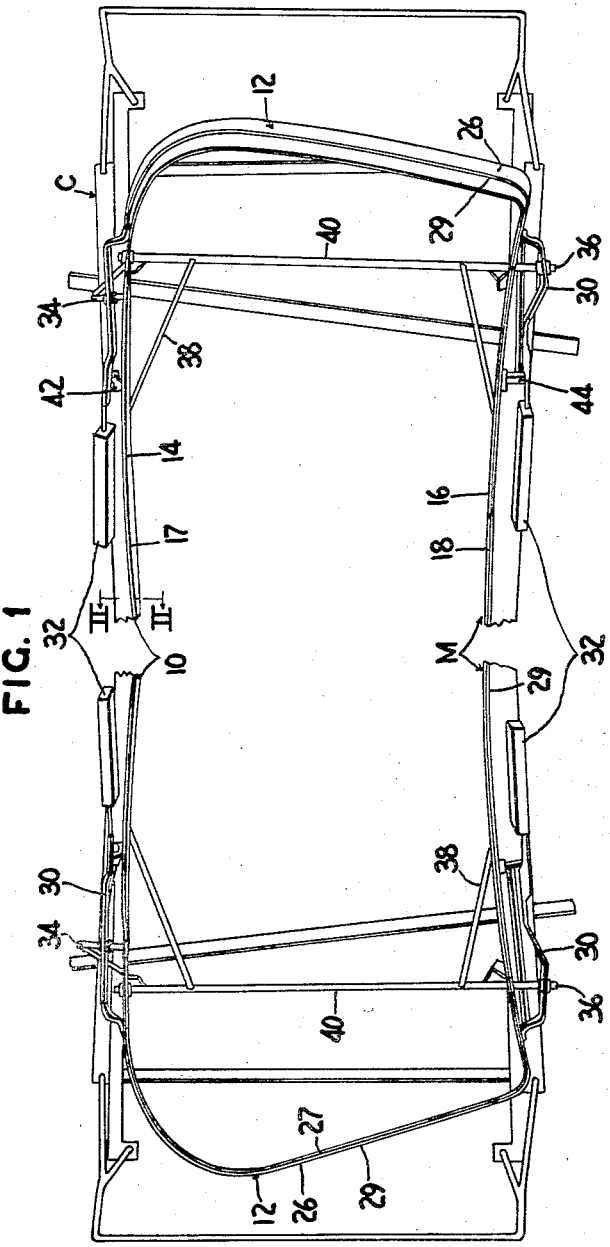
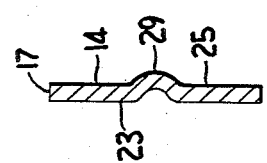
INVENTOR.
CHARLES H. SCHNORR JR
BY
*Oscar L. Spencer*
ATTORNEY United States Patent Office 2,848,846
Patented Aug. 26, 1958

2,848,846

GLASS BENDING MOLDS

Charles H. Schnorr, Jr., Blawnox, Pa., assignor to Pittsburgh Plate Glass Company, Allegheny County, Pa., a corporation of Pennsylvania.

Application April 30, 1956, Serial No. 579,561

4 Claims. (Cl. 49—67)

The present application relates to glass bending molds. Specifically, this invention concerns sectionalized skeleton molds whose sections include rails of a novel reinforced construction.

Conventionally, flat glass sheets are bent into curved shapes by mounting them on sectionalized skeleton molds comprising frame-like molding members which are spread apart to receive flat glass sheets and are capable of moving into a closed mold position to form a substantially continuous frame conforming in elevation and outline to the curvature desired for the bent glass. The glass laden molds are conveyed through a tunnel-like lehr where the glass and the mold are heated to glass softening temperatures. At these temperatures, the glass softens and the mold moves into its closed position. The bent glass sheet is then annealed or tempered depending upon the article into which it is to be fabricated.

The sectionalized molds previously used comprised a central section including a pair of spaced rails curved to conform to the margins desired for the central portion of the glass sheet margins. These rails were interconnected by criss-crossing bracing members. The molds also included substantially U-shaped end molding members having an outline conforming to the shape desired for each extremity of the glass sheet and including criss-crossing reinforcing bracing members. When glass is bent on sectionalized molds according to the conventional method described above, a pattern similar to that formed by the bracing members appears in polarized light in the bent glass sheets. This bracing pattern can be seen with the naked eye in certain situations when light reflected in a particular plane is transmitted through the bent glass sheet.

Other sectionalized molds have utilized reinforcements immediately outside the mold shaping surface. A typical construction is shown in U. S. Patent 2,691,854 to Rugg. However, such molds have been found to be undesirable because the total mass of the outside frame, the structural braces between the mold sections and the bracing structure absorb a considerable portion of the lehr heat. This energy should be employed more efficiently to heat the glass sheet to be bent rather than wasted in heating the superfluous mass attached to the glass bending apparatus.

The present invention avoids the deficiencies recited above by providing novel reinforcement for the mold rails used in sectionalized glass bending molds. In order to minimize the additional mass of reinforcing metal typical of the prior art, the rail members are reinforced in a novel manner. This reinforcement is accomplished by crimping each rail along substantially its entire length. The crimp is provided approximately centrally of the longitudinally extending upper and lower edges of the rail.

The upper longitudinal edge surface of the rail provides the glass engaging surface for a portion of the mold. The crimp is spaced from the bottom glass surface by a distance equal to the spacing of the crimp from the glass shaping surface of the mold. Thus, the effect of the crimp on the stress pattern in the glass is limited to the glass sheet margin which is hidden when the glass is mounted as an automobile windshield.

An object of the present invention is to improve sectionalized bending molds by providing improved reinforcement for the mold rails for the molding members, thereby substantially eliminating the necessity for the cross bracing members or exterior bracing previously used.

Another object of the present invention is to provide sectionalized molds for bending glass sheets that combine a minimum of mass and hence, a minimum of thermal capacity, with a maximum of structural rigidity.

These and other objects will become apparent upon studying the description of a particular embodiment which follows. In the drawings which form part of the description, Figure 1 is a plan view of a bending mold constructed according to the present invention mounted upon a mold support carriage and showing a portion of the mold in its open position at the left side of the drawing and in its closed position at the right side of the drawing.

Figure 2 is a cross-section taken along the lines II—II of Figure 1 showing one suggested construction for the reinforced rail.

Referring to the drawings, a glass bending mold for bending elongated glass sheets and shown generally at M, comprises a center or intermediate molding section 10 and end molding sections 12. Center molding section 10 comprises a pair of spaced rails 14 and 16. Rails 14 and 16 have upper edge surfaces 17 and 18, respectively, that conform to the shape desired for the center portion of the longitudinal edges of the glass sheet. The rails extend longitudinally of the mold and are disposed edgewise with their width dimension oriented vertically.

The outboard molding members 12 each comprise substantially C-shaped rails 26 having upper edge surfaces 27 conforming in elevation and outline to the contour desired for a marginal extremity of the bent glass sheet. Outboard rails 26 are disposed edgewise to be substantially perpendicular across their width to the shaping surface desired for the local areas of the glass.

Each of the rails 14, 16 and 26 are crimped at 29 to improve the structural rigidity of the rails and avoid the necessity of the cross-bracing or additional structural requirements of prior art molds. The crimp may be directed to the outside or the inside of the mold. Crimping outwardly so that the inner major surface 23 is made concave and the outer major surface 25 convex at the crimp insures that any stress imparted to the glass by virtue of the proximity of the crimp is located in a portion of the sheet to be covered by a panel molding. Crimping inwardly facilitates attachment of mold actuating means to the molding members.

A strap 30 is connected to each inboard extremity of each outboard molding member 12. A counterweight 32 is attached to the inboard extremity of each strap 30. Each strap 30 makes bearing contact with a stub rod 34 or 36. Stub rods 34 and 36 are connected to the outboard lateral surfaces of center mold rails 14 and 16, respectively. Brace rods 38 extend obliquely downwardly and longitudinally outwardly from the under-surface of the rails 14 or 16 to connect with a cross rod 40. The latter in turn is mounted on the superstructure of a carriage C to support the mold thereon during its passage through a bending lehr.

Cross rod 40 serves to keep rails 14 and 16 at a proper lateral spacing and is preferably spaced a minimum of 3 inches below the glass engaging surface of the mold. If cross rod 40 is closer to the glass than 3 inches, the glass is liable to become subjected to a stress pattern reflecting the shape of the cross rod.

Tabs 42 and 44 extend outwardly from the center section rails 14 and 16 respectively to prevent the outboard molding members from rotating beyond the desired rotation. When the outboard molding members 12 rotate sufficiently with respect to center molding member 10, portions of the straps 30 abut the tabs 42 and 44, thus stopping the rotation.

The mold M is used to bend glass sheets in the following manner. It is first loaded onto a mold support carriage C with cross rods 40 providing a fixed support for the center mold section 10 on the carriage. The outboard molding section 12 are rotated into their spread positions to receive one or more sheets of flat glass. The flat glass sheets are sufficiently heavy to maintain the outboard molding sections 12 in their spread position while the sheets are rigid.

After the glass is loaded on the mold at the entrance of a tunnel-like glass bending lehr, the glass laden mold is conveyed on its mold support carriage through the lehr. During this movement, the glass and mold are subject to gradually increasing temperatures until the glass attains glass softening temperature.

Softening of the glass permits the counterweights 32 to rotate the outboard molding sections 12 about the stub hinges 34 and 36. This bending continues until the straps 30 engage the stop members 42 and 44. At this moment, the rails of the center and outboard molding sections provide a substantially continuous frame conforming in elevation and outline to the shape desired for the margin of the bent glass sheet. The glass laden mold is then removed from the region of glass softening temperature and either tempered by sudden chilling or annealed by gradual cooling.

For molds used to bend sheets for windshields, wherein the bent glass sheets are annealed, rails 14, 16 and 26 are preferably constructed of solid bands of 18-8 stainless steel alloy (18% by weight Cr., 8% Ni; balance Fe and impurities) ⅛ inch thick and 1½ inches wide. The crimp 29 is preferably not more than ¼ inch in amplitude. This improved construction provides sufficient rigidity to prevent the mold rails from warping during use and also eliminates the necessity for the cross-bracing or peripheral reinforcement heretofore found necessary.

While the mold rails have been described as being crimped longitudinally throughout substantially their entire length, it is understood that the length required for the crimp depends upon the mass of glass sheet to be supported, which determines the rigidity required. Also, in cases where the rails 26 enclose pointed extremities, the necessity for crimping at the extremities of the mold is not vital and the crimping of the rails can be discontinued at sharply pointed extremities. The extreme curvature along a longitudinal dimension provides some of the reinforcement obtained by crimping longitudinally those portions of the rails that are either straight or only gently curved along their longitudinal axes.

The detailed description of certain embodiments of my invention is for illustration rather than limitation. The latter may be determined by studying the claims which follow.

What is claimed is:

1. A sectionalized glass sheet bending mold of the skeleton type designed to have a minimum of thermal capacity combined with a maximum of structural rigidity comprising mold sections relatively movable between a spread position for supporting flat glass and a closed position wherein the upper surfaces of the mold sections provide a substantially continuous skeleton frame conforming in elevation and outline to the ultimate shape desired for the bent glass sheet, each mold section comprising an edgewise disposed rail curved lengthwise to provide a curved upper edge conforming to the elevation and outline desired for a portion of the ultimate shape of the glass sheet, said rails being longitudinally crimped for substantially their entire length, thereby providing the rails with sufficient structural rigidity to enable the mold structure to require substantially less interior or exterior bracing than that required for a mold whose rails are not reinforced by crimping.

2. The apparatus according to claim 1, wherein the amplitude of the crimp does not exceed one-quarter inch.

3. A sectionalized glass sheet bending mold of the skeleton type designed to have a minimum of thermal capacity combined with a maximum of structural rigidity comprising mold sections relatively movable between a spread position for supporting flat glass and a closed position wherein the upper surfaces of the mold sections provide a substantially continuous skeleton frame conforming in elevation and outline to the ultimate shape desired for the bent glass sheet, each mold section comprising an edgewise disposed rail curved lengthwise to provide a curved upper edge conforming to the elevation and outline desired for a portion of the ultimate shape of the glass sheet, said rails being longitudinally crimped substantially parallel to said upper edge and for substantially their entire length, thereby providing the rails with sufficient structural rigidity to enable the mold structure to require substantially less interior or exterior bracing means than that required for a mold whose rails are not reinforced by crimping.

4. A sectionalized glass sheet bending mold of the skeleton type designed to have a minimum of thermal capacity combined with a maximum of structural rigidity comprising a plurality of mold sections including end mold sections and an intermediate mold section, said end mold sections being movable relative to said intermediate mold section between a spread mold position for supporting flat glass and a closed mold position wherein the upper surfaces of the mold sections provide a substantially continuous frame conforming in elevation and outline to the ultimate shape desired for the bent glass sheet, each mold section comprising an edgewise disposed rail curved lengthwise to provide a curved upper edge conforming to the elevation and outline desired for a portion of the ultimate shape of the glass sheet, the intermediate mold section comprising a pair of spaced, longitudinally curved rails extending lengthwise to enable their upper edges to form portions of the mold frame, each of said intermediate mold section rails being longitudinally crimped for substantially its entire length, thereby providing the rails with sufficient structural rigidity to enable the mold to require substantially less interior or exterior bracing than that required for a mold whose rails are not reinforced by crimping.

References Cited in the file of this patent

UNITED STATES PATENTS

| | | |
|---|---|---|
| 1,017,243 | Budd | Feb. 13, 1912 |
| 2,297,315 | Owen | Sept. 29, 1942 |
| 2,408,526 | Minton | Oct. 1, 1946 |
| 2,443,170 | Smith | June 8, 1948 |
| 2,518,951 | Smith | Aug. 15, 1950 |
| 2,633,673 | Bamford et al. | Apr. 7, 1953 |
| 2,691,854 | Rugg | Oct. 19, 1954 |

OTHER REFERENCES

"Metal Mouldings and Accessories Catalog," No. 3-49, page 18, published by the Loxit Moulding Co., 1217 W. Washington Blvd., Chicago 7, Ill., published Feb. 16, 1949.

"Bethlehem Carbon Steel Bars and Special Sections," page 10, published by Bethlehem Steel Co., Bethlehem, Pa., 1937.

UNITED STATES PATENT OFFICE
CERTIFICATE OF CORRECTION

Patent No. 2,848,846                                                  August 26, 1958

Charles H. Schnorr, Jr.

It is hereby certified that error appears in the printed specification of the above numbered patent requiring correction and that the said Letters Patent should read as corrected below.

Column 4, line 28, after "bracing" strike out "means"; line 68, list of references cited, under "OTHER REFERENCES", for "No. 3-49" read -- No. 3-48 --.

Signed and sealed this 7th day of April 1959.

(SEAL)
Attest:

KARL H. AXLINE
Attesting Officer

ROBERT C. WATSON
Commissioner of Patents